(12) United States Patent
Noda et al.

(10) Patent No.: US 7,795,348 B2
(45) Date of Patent: Sep. 14, 2010

(54) PRIMER COMPOSITION FOR COATING

(75) Inventors: Tetsuya Noda, Coventry (GB); Toru Tokimitsu, Tokyo (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 12/028,396

(22) Filed: Feb. 8, 2008

(65) Prior Publication Data

US 2008/0139748 A1 Jun. 12, 2008

Related U.S. Application Data

(62) Division of application No. 10/524,838, filed as application No. PCT/JP03/10648 on Aug. 22, 2003, now abandoned.

(30) Foreign Application Priority Data

| Aug. 22, 2002 | (JP) | ............................. 2002-241609 |
| Sep. 13, 2002 | (JP) | ............................. 2002-268434 |
| Dec. 19, 2002 | (JP) | ............................. 2002-368322 |

(51) Int. Cl.
- *C08L 23/12* (2006.01)
- *C08L 23/14* (2006.01)
- *C08L 33/02* (2006.01)
- *C08L 35/00* (2006.01)
- *C08L 41/00* (2006.01)
- *C08F 4/28* (2006.01)
- *C08F 20/10* (2006.01)

(52) U.S. Cl. ........................ 525/191; 525/208; 525/221; 525/240; 526/227; 526/318

(58) Field of Classification Search ................ 525/191, 525/208, 221, 240; 526/227, 318
See application file for complete search history.

(56) References Cited

U.S. PATENT DOCUMENTS

| 3,234,039 A | 2/1966 | Lalk et al. |
| 3,394,029 A * | 7/1968 | MacArthur ................. 428/518 |
| 3,654,021 A | 4/1972 | Henkler et al. |
| 4,910,281 A | 3/1990 | Johnson |
| 5,817,370 A | 10/1998 | Hinzte-Bruning et al. |
| 5,910,370 A | 6/1999 | Katsura et al. |
| 6,902,766 B1 | 6/2005 | Kucera |

FOREIGN PATENT DOCUMENTS

| JP | 56-99667 | 8/1981 |
| JP | 63-24628 | 5/1988 |
| JP | 6-128544 | 5/1994 |
| JP | 9-25452 | 1/1997 |
| WO | 01/40386 | 6/2001 |
| WO | 01/74499 | 10/2001 |
| WO | 01/96487 | 12/2001 |

* cited by examiner

*Primary Examiner*—Nathan M Nutter
(74) *Attorney, Agent, or Firm*—Oblon, Spivak, McClelland, Maier & Neustadt, L.L.P.

(57) ABSTRACT

Disclosed is a primer composition for coating having excellent adhesion properties to a substrate and comprising a polyolefin resin or acrylic resin, without the use of a chlorine-containing compound, which primer composition essentially comprises a polymer (A) having at least a unit of a (meth) acrylic ester monomer (a) in which acryloyloxy group or methacryloyloxy group is bonded to secondary carbon atom or tertiary carbon atom.

17 Claims, 1 Drawing Sheet

PRIMER COMPOSITION FOR COATING

CROSS REFERENCE TO RELATED APPLICATIONS

This application is a division of U.S. patent application Ser. No. 10/524,838, which is the U.S. National Stage of International Application No. PCT/JP03/10648, filed Aug. 22, 2003, the disclosures of which are incorporated herein by reference in their entireties. This application claims priority to Japanese Patent Applications No. JP 2002-241609, filed Aug. 22, 2002, No. JP 2002-268434, filed Sep. 13, 2002, and No. JP2002-268322, filed Dec. 19, 2002, the disclosures of which are incorporated herein by reference in their entireties.

TECHNICAL FIELD

The present invention relates to a primer composition used for coating as an undercoat when a substrate comprising principally a polyolefin resin or acrylic resin is coated with a paint.

BACKGROUND ART

A polyolefin resin which is a polymer of an olefin monomer is widely employed in various uses since the polyolefin resin is excellent in mechanical properties and chemical resistance, and it can easily be subjected to forming at a small cost. Moreover, the uses of the polyolefin resin are further being expanded with global environmental problems in recent years as its background since the polyolefin resin is superior in the ease of recycling.

On the other hand, it is known that the coating or adhesion of a paint to the surface of a polyolefin resin molded product is difficult since the polyolefin resin is nonpolar. Accordingly, when coating or adhesion of a paint to the surface of a polyolefin resin molded product is carried out, a method has generally been adopted in which the surface of the polyolefin resin molded product is subjected to a surface treatment such as a plasma treatment, flame treatment, UV-light irradiation treatment, and chromic acid treatment in advance to activate the surface thereby improve the adhesion of a paint.

However, it makes the coating process complicated, requires a large facility expense, and causes a time loss to conduct such extra surface treatment. Besides, the method for the surface treatment has such an inconvenience as an unevenness in the effect of the surface treatment is ready to produce by the difference in the shape or size of the molded product or by the effect of a pigment or additive contained in the polyolefin resin.

As a method for coating the surface of a polyolefin resin without performing the surface treatment described above, a method is known in which a chlorinated polyolefin having a strong adhesive force to a polyolefin resin is used as a primer (a lower layer of coating) and an acrylic resin or the like is used as the top coat (the upper layer of coating). For instance, as a paint having a good adhesive property to a polyolefin resin, a paint of a resin composition comprising a chlorinated polyolefin and an acrylic copolymer at a ratio of 10:90 to 90:10 is disclosed in Japanese Examined Patent Application, Second Publication No. Sho 63-24628 (Japanese Unexamined Patent Application, First Publication No. Sho 58-176207).

However, in the paint described above, a chlorine-containing compound is used, and thus the use of the paint tends to be avoided from an upsurge of interest in environmental problems in recent years. Therefore, the demand for a primer composition used for coating and containing no chlorine has rapidly been raised in these days.

Further, it is lately been required to provide a primer composition used for coating and having excellent adhesive properties even to such a resin as an acrylic resin in addition to a polyolefin resin.

DISCLOSURE OF INVENTION

An object of the present invention is to provide a primer composition for coating having excellent adhesive properties to a substrate such as a polyolefin resin and acrylic resin without the use of a compound having chlorine atom.

The aspects of the present invention are concerned with primer compositions for coating containing a polymer (A) having a unit of a (meth)acrylic ester monomer (a) in which acryloyloxy group or methacryloyloxy group is bonded to secondary carbon atom or tertiary carbon atom.

BEST MODE FOR CARRYING OUT THE INVENTION

Figure 1:
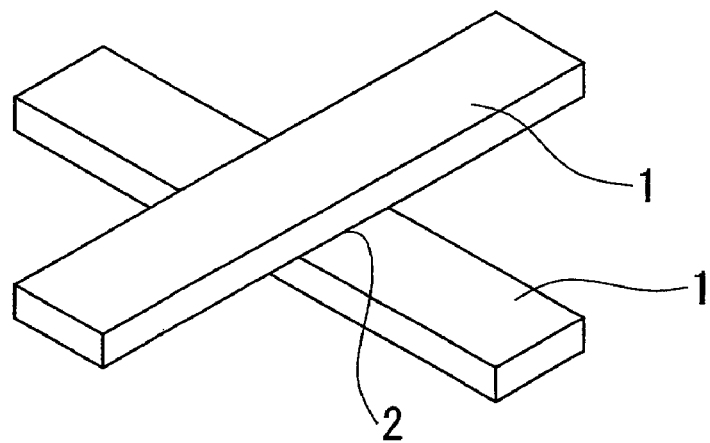
FIG. 1 shows an angular perspective view illustrating a test piece used for adhesion peel test.

Now, the best embodiments of the present invention are described in detail.

In the (meth)acrylic ester monomer (a) used in the present invention, acryloyloxy group ($CH_2$=CHCOO—) or methacryloyloxy group ($CH_2$=C($CH_3$)COO—) is bonded to secondary carbon atom or tertiary carbon atom. In this connection, "the secondary carbon atom" or "tertiary carbon atom" means a carbon atom bonded to optional two or three groups other than hydrogen atom and except the acryloyloxy group or methacryloyloxy group. These optional groups may be bonded with each other to form a ring.

Further, the term "(meth)acrylic ester" used herein means acrylic ester or methacrylic ester.

The primer composition of the present invention used for coating contains a polymer (A) which has a unit of a specific (meth)acrylic ester monomer (a).

[Polymer (A)]

The polymer (A) has at least a unit of a (meth)acrylic ester monomer (a) in which acryloyloxy group or methacryloyloxy group is bonded to secondary carbon atom or tertiary carbon atom, as (meth)acrylic ester monomer.

As the monomer (a) which constitutes a unit of a (meth) acrylic ester monomer in which acryloyloxy group or methacryloyloxy group is bonded to secondary carbon atom, for example, (meth)acrylic ester monomers having an alicyclic hydrocarbon group of a monocyclic structure or polycyclic structure such as cyclopentyl (meth)acrylate, cyclohexyl (meth)acrylate, cycloheptyl (meth)acrylate, cyclooctyl (meth)acrylate, 4-t-butylcyclohexyl (meth)acrylate, 3,3,5-trimethylcyclohexyl (meth)acrylate, tricyclodecanyl (meth) acrylate, cyclopentadienyl (meth)acrylate, isobornyl (meth) acrylate, and adamantyl (meth)acrylate can be mentioned.

These monomers can be used alone or in combination of two or more.

Among these monomers, cyclohexyl (meth)acrylate, 4-t-butylcyclohexyl (meth)acrylate, 3,3,5-trimethylcyclohexyl (meth)acrylate, isobornyl (meth)acrylate, and tricyclodecanyl (meth)acrylate are preferable from the viewpoint of increased availability and adhesive properties to a substrate. Further, 4-t-butylcyclohexyl (meth)acrylate, 3,3,5-trimethylcyclohexyl (meth)acrylate, isobornyl (meth)acrylate, and tricyclodecanyl (meth)acrylate are especially preferable from the viewpoint of high heat resistance and elasticity of a polymer (A) to be obtained.

As examples of monomer (a) which constitutes a unit of a (meth)acrylic ester monomer in which acryloyloxy group or methacryloyloxy group is bonded to tertiary carbon atom, (meth)acrylic ester monomers having a branched hydrocarbon group such as t-butyl (meth)acrylate, t-amyl (meth)acrylate, isopropyl (meth)acrylate, dipropylmethyl (meth)acrylate, tripropylmethyl (meth)acrylate, diisopropylmethyl (meth)acrylate, triisopropylmethyl (meth)acrylate, dibutylmethyl (meth)acrylate, tributylmethyl (meth)acrylate, diisobutylmethyl (meth)acrylate, triisobutylmethyl (meth)acrylate, di-t-butylmethyl (meth)acrylate, and tri-t-butylmethyl (meth)acrylate can be mentioned.

These monomers can be used alone or in combination of two or more.

Among these monomers, t-butyl (meth)acrylate and t-amyl (meth)acrylate are preferable from the viewpoint of increased availability and coating workability, and t-butyl (meth)acrylate is especially desirable.

The polymer (A) may contain a unit of a (meth)acrylic ester monomer (a) in which acryloyloxy group or methacryloyloxy group is bonded to secondary carbon atom and another unit of a (meth)acrylic ester monomer (a) in which acryloyloxy group or methacryloyloxy group is bonded to tertiary carbon atom. In this case, while the ratio of the unit of the former monomer (a) to the unit of the latter monomer (a) may be selected optionally in a suitable manner in accordance with performances required for the polymer (A) to be obtained, it is preferable that the amount of the unit of the (meth)acrylic ester monomer (a) in which acryloyloxy group or methacryloyloxy group is bonded to secondary carbon atom is more than 50% by mass.

Further, the polymer (A) may be a copolymer having a unit of another monomer (b) different from a unit of the monomer (a), in addition to the unit of the monomer (a).

Such polymer (A) can be obtained by copolymerizing the monomer (a) with another monomer (b) copolymerizable therewith.

The monomer (b) is not particularly limited as long as it is a monomer different from the monomer (a) and copolymerizable with the monomer (a). As the monomer (b), for example, (meth)acrylic esters such as methyl methacrylate (MMA), methyl acrylate (MA), ethyl (meth)acrylate, n-propyl (meth)acrylate, n-butyl (meth)acrylate, isobutyl (meth)acrylate, isoamyl (meth)acrylate, lauryl (meth)acrylate, dodecyl (meth)acrylate, benzyl (meth)acrylate, and 2-ethylhexyl (meth)acrylate; branched or linear olefins such as ethylene, propylene, 1-butene, 2-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, and 1-eicosene; cyclic olefins such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; $\alpha,\beta$-unsaturated carboxylic acids such as methacrylc acid, acrylic acid, maleic acid, fumaric acid, itaconic acid, maleic anhydride, itaconic anhydride, and bicyclo[2.2.1]-5-heptene-2,3-dicarboxylic anhydride; maleimides such as N-phenylmaleimde, N-cyclohexylmaleimide, and N-t-butylmaleimide; vinyl esters such as vinyl caprate, vinyl laurate, vinyl stearate, and vinyl trifluoroacetate; dienes such as butadiene, isoprene, 4-methyl-1,3-pentadiene, and 1,3-pentadiene; nitrogen-containing monomers such as (meth)acrylamide, (meth)acrylonitrile, diacetone acrylamide, and dimethylaminoethyl metacrylate; epoxy group-containing monomers such as allyl glycidyl ether, glycidyl acrylate, and glycidyl methacrylate; and aromatic vinyl compounds such as styrene and mono- or polyalkylstyrenes such as o-methylstyrene, m-methylstyrene, p-methylstyrene, and o, p-dimethylstyrene can be mentioned.

In addition to the compounds mentioned above, monomers having hydroxy group in the molecule are particularly preferable for the purpose of imparting good adhesive properties to a paint to be coated thereon as well as a high pigment dispersibility, to a primer composition. Such monomers are not particularly limited as long as they have hydroxy group in the molecule. As such monomers, for example, various (meth)acrylic esters, having hydroxy group, such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, 3-chloro-2-hydroxypropyl (meth)acrylate, polyethylene glycol (meth)acrylate, polypropylene glycol (meth)acrylate, PLACCEL FM or FA (produced by Daicel Chemical Industries, Ltd.; caprolactone adduct monomer), trade name: FM-1 or FM-2 (produced by Daicel Chemical Industries, Ltd.; adduct of 2-hydroxyethyl methacrylate with one or two molecules of $\epsilon$-caprolactones), and CHDMMA (produced by Nippon Kasei Chemical Co., Ltd.; 1,4-cyclohexanedimethanol acrylate) can be mentioned.

Among the monomers (b), (meth)acrylic esters and monomers having hydroxy group in the molecule are preferable from the viewpoint of increased availability, adhesive properties to a polyolefin substrate, and adhesive properties to a paint applied thereon, and especially, methyl (meth)acrylate, n-butyl (meth)acrylate, lauryl (meth)acrylate, dodecyl (meth)acrylate, staryl (meth)acrylate, glycidyl (meth)acrylate, (meth)acrylic acid, 2-hydroxyethyl (meth)acrylate, 2-hydroxypropyl (meth)acrylate, 3-hydroxypropyl (meth)acrylate, 4-hydroxybutyl (meth)acrylate, FM-1 or FM-2, and CHDMMA are preferable.

The monomers (b) can be used alone or in combination of two or more.

When the polymer (A) is a copolymer having a unit of the monomer (a) and a unit of the monomer (b), the polymer (A) may have any type of polymer structure like the polymer structure in a random copolymer, graft copolymer, or block copolymer. However, the polymer (A) preferably has a number average molecular weight of 5,000 to 500,000, and more desirably 10,000 to 300,000 from the viewpoint of coating workability of a primer composition to be obtained, and strength and shape maintenance of a film formed.

The content of the unit of the monomer (a) in the polymer (A) is preferably 30 to 99% by mass, more desirably 30 to 95% by mass, and most preferably 50 to 95% by mass, from the viewpoint of adhesive properties of a primer composition to a substrate and mechanical strength of a film formed. The content of the unit of the monomer (b) is preferably 1 to 70% by mass, more desirably 5 to 70% by mass, and most preferably 5 to 50% by mass.

Further, as the polymer (A), a polymer having the unit of monomer (a) can be used alone, or in combination of two or more to form a polymer composition. For instance, it is possible to use a polymer composition comprising a polymer (A-1) having a unit of a monomer (a) and a polymer (A-2) having a unit of another monomer (a) which is different from the monomer (a) constituting the polymer (A-1), or to use another polymer composition comprising a polymer (A-3)

having a unit of a monomer (a) and a copolymer (A-4) having a units of monomer (a) and monomer (b). Number average molecular weight of the polymers is preferably 5,000 to 500,000 and more desirably 10,000 to 300,000 from the viewpoint of the coating workability of a primer composition, and the strength and shape maintenance of a film formed.

While the amount of the polymer (A) to be blended is suitably decided in accordance with desired performances of a primer composition to be obtained, it is preferably 30 to 99% by mass based on the amount of the total solid components from the viewpoint of adhesive properties to a substrate and a top coat. As used herein, "the amounts of the total solid components" means the total of the amount of an acrylic type polymer (A), another polymer (B) described below, and other solid components described below. The amount of the polymer (A) based on the amount of the total solid components may be 100% by mass, that is, another polymer (B) and other solid components are not necessary to be contained.

As a method for preparing a polymer (A), a known polymerization method, for example, a radical polymerization such as a bulk polymerization, solution polymerization, suspension polymerization, and emulsion polymerization, anion polymerization, group transfer polymerization (GTP), and coordination anion polymerization can be adopted.

There is no particular limitation in polymerization temperature. For instance, the polymerization can be carried out at a temperature of −100 to 250° C., preferably 0 to 200° C.

In addition, a chain transfer agent such as a mercaptan and hydrogen may be added to adjust the molecular weight of a polymer to be obtained.

When the polymerization is carried out in the presence of a radical polymerization initiator, an organic peroxide or azo compound can be used as the radical polymerization initiator.

As specific examples of preferable organic peroxides to be used as radical polymerization initiator, 2,4-dichlorobenzoyl peroxide, t-butyl peroxypivalate, o-methylbenzoyl peroxide, bis-3,5,5-trimethylhexanoyl peroxide, octanoyl peroxide, t-butyl-peroxy-2-ethylhexanoate, cyclohexanone peroxide, benzoyl peroxide, methyl ethyl ketone peroxide, dicumyl peroxide, lauroyl peroxide, diisopropylbenzene hydroperoxide, t-butyl hydroperoxide, and di-t-butyl peroxide can be mentioned.

On the other hand, as specific examples of azo compounds, 2,2'-azobisisobutyronitrile, 2,2'-azobis(2,4-dimethylvaleronitrile), and 2,2'-azobis(2,4-dimethyl-4-methoxyvaleronitrile can be mentioned.

Among these compounds, benzoyl peroxide, 2,2'-azobisisobutyronitrile, 2,2'-azobis(2,4-dimethylvaleronitrile, and 2,2'-azobis(2,4-dimethyl-4-methoxyvaleronitrile are preferable.

These radical polymerization initiators can be used alone or in combination of two or more.

The amount of the radical polymerization initiator to be added is preferably within the range of 0.0001 to 10 parts by mass based on 100 parts by mass of the total monomers used.

[Polymer (B)]

For the purpose of improving the adhesive properties, and coating performances or workability of a primer composition for coating, a polymer (B) may be added, in addition to the polymer (A), to produce the primer composition of the present invention.

The polymer (B) is not particularly limited as long as it is a polymer comprised of a monomer different from a (meth) acrylic ester monomer (a) in which acryloyloxy group or methacryloyloxy group is bonded to secondary carbon atom or tertiary carbon atom. As the polymer (B), for example, a polymer of an aromatic vinyl compound such as polystyrene, polymer of (meth)acrylic ester, polyester, and polyolefin resin can be mentioned.

Among these polymers, a polymer having a unit of a (meth) acrylic ester monomer (c) different from a (meth)acrylic ester (a) in which acryloyloxy group or methacryloyloxy group is bonded to secondary carbon atom or tertiary carbon atom is preferable from the viewpoint of the compatibility with a polymer (A). As the monomer (c), while (meth)acrylic esters mentioned as a part of the group of the monomer (b) described above can be used, methyl methacrylate, n-butyl methacrylate, lauryl methacrylate, dodecyl methacrylate, stearyl methacrylate, methyl acrylate, n-butyl acrylate, and glycidyl methacrylate are preferable from the viewpoint of increased availability, and methyl methacrylate is especially desirable. The monomer (c) can be used alone or in combination of two or more.

Further, the polymer (B) may be a copolymer having a unit of a monomer (c) and a unit of a monomer (d) different from the monomer (c).

The monomer (d) is not particularly limited as long as it is a vinyl monomer copolymerizable with a monomer (c). As the monomer (d), monomers exemplified above as monomer (b) which constitutes a polymer (A) can be mentioned as examples. Among them, styrene, N-phenylmaleimide, N-cyclohexylmaleimide, 1-hexene, 1-octene, and 1-decene are preferable from the viewpoint of increased availability and adhesive properties of a primer composition to a substrate. The monomer (d) can be used alone or in combination of two or more.

While the contents of a unit of monomer (c) and the unit of monomer (d) in a polymer (B) are suitably decided according to the performances of a primer composition, the content of the unit of monomer (c) is preferably 30 to 100% by mass and the content of the unit of monomer (d) is preferably 70 to 0% by mass from the viewpoint of adhesive properties of a primer composition to a substrate and a top coat.

Further, as the polymer (B), a polyolefin resin is also preferable from the viewpoint of adhesive properties to a polyolefin substrate.

As specific examples of the polyolefin resin, a crystalline polyolefin such as a low-density polyethylene, ultra-low-density polyethylene, super-ultra-low-density polyethylene, linear low-density polyethylene, high-density polyethylene, ultra-high-molecular-weight polyethylene, and polypropylene, ethylene-propylene copolymer, poly(methylpentene), propylene-1-butene copolymer, propylene-ethylene-1-butene copolymer, copolymer of propylene with an α-olefin having 5 to 12 carbon atoms, ethylene-nonconjugated diene copolymer, propylene-nonconjugated diene copolymer, ethylene-propylene-nonconjugated diene copolymer, polybutene, hydrogenated conjugated diene-typed elastomer having a block mainly composed of at least two aromatic vinyl compounds and a polymer block mainly composed of at least one conjugated diene compound, more than 80% of the conjugated portions of which diene compound are hydrogenated, and a low-crystalline or noncrystalline polyolefins such as an ethylene-vinyl acetate copolymer, ethylene-vinyl trimethoxysilane copolymer, ethylene-methyl acrylate copolymer, ethylene-ethyl acryalte copolymer, and ethylene-methyl methacrylate copolymer can be mentioned.

Among these polymers or copolymers, a low-crystalline or noncrystalline polyolefin and a conjugated diene-typed elastomer are preferable from the viewpoint of the solubility of a polymer in a solvent and the adhesive properties of a primer composition, and an ethylene-propylene copolymer, propylene-1-butene copolymer, propylene-ethylene-1-butene copolymer, and hydrogenated conjugated diene-typed elastomer having a block mainly composed of at least two aromatic vinyl compounds and a polymer block mainly composed of at least one conjugated diene compound, more than 80% of the conjugated portions of which diene compound are hydrogenated, are more desirable.

These polymers or copolymers can be used alone or in combination of two or more.

While the amount of the polymer (B) to be blended, based on the total amount of solid components, is suitably decided according to desired performances of a primer composition, it is preferably 1 to 70% by mass from the viewpoint of the adhesive properties of a primer composition to a substrate and top coat.

[Other Components]

When necessary, several kinds of stabilizers such as an antioxidant, UV-light absorber, weathering stabilizer, radiation stabilizer, and thermal stabilizer; a coloring agent such as an inorganic pigment, organic pigment, and dye; electrical conductivity imparting agent such as a carbon black and ferrite; and other solid components or nonsolid components such as an inorganic filler, lubricant, plasticizer, organic peroxide, neutralizing agent, and crosslinking agent can be added to a primer composition of the present invention for coating.

[Solvent]

In order to improve the coating workability of the primer composition of the present invention for coating, a solvent in which the polymers (A) and (B), and the other components are soluble is preferably added to the primer composition. Also, it is preferable to adjust the total concentrations of the polymers (A) and (B), and solid components in the primer composition of the present invention including the organic solvent, to a value lower than 50% by mass from the viewpoint of handling properties of the composition.

Further, it is permitted to first prepare a primer composition only from solid components including a polymer (A) and then mix the primer composition with an organic solvent to produce a final primer composition before it is actually used.

It is satisfactory that an organic solvent which can preferably be used dissolves the polymer and other components. Thus, for example, an aromatic hydrocarbon such as toluene, xylene, Swasol #1000 (produced by Maruzen Petrochemical Co., Ltd.), Solvesso #100 (produced by Exxon Chemical Co., Ltd.), and Solvesso #150 (produced by Exxon Chemical Co., Ltd.); an alicyclic hydrocarbon such as cyclohexane and methylcyclohexane; a ketone such as methyl ethyl ketone, methyl isobutyl ketone, and cyclohexanone; ethyl acetate, n-butyl acetate, propylene glycol monomethyl ether acetate; an ester such as DBE (produced by Du Pont Co., Ltd.); an alcohol such as n-butanol, isopropyl alcohol, and cyclohexanol; a glycol type solvent such as ethylene glycol monobutyl ether, and propylene glycol monomethyl ether; and an aliphatic hydrocarbon such as mineral turpen and ISOPAR E (produced by Exxon Chemical Co., Ltd.) can be mentioned as the organic solvent. Among them, an aromatic hydrocarbon, alicyclic hydrocarbon, and ester are especially preferable. These solvents can be used alone or in combination of two or more.

The primer composition of the present invention for coating is formulated as described above, and by adopting such formulation, it becomes possible to provide a primer composition used for coating, and excellent in the solubility in a solvent and the adhesive properties (adhesiveness) to a substrate comprising a polyolefin resin or (meth)acrylic resin without using a chlorine-containing compound. The primer composition of the present invention for coating is mild to environment since it does not requires a chlorine-containing compound as essential component.

Coating by using a primer composition of the present invention is conducted by a known usual method. For instance, a method in which a primer composition of the present invention for coating is applied by spraying the primer composition as it is or after diluted with an organic solvent on the surface of a substrate by using a spray gun and the like so that the thickness of the dried film becomes about 1 to 80 μm can be mentioned as coating method.

Also, the primer composition of the present invention for coating is effective to improve the adhesiveness of a paint to the surface of a molded article comprising a polyolefin resin to which the adhesive properties of a paint was not good when a conventional primer composition was used. As a substrate comprising a polyolefin resin, for example, a molded product for the parts of automobile and a molded product for household electrical appliances each comprising a polyolefin resin such as a high-pressure polyethylene, moderate- to low-pressure polyethylene, polypropylene, poly-4-methyl-1-pentene, polystyrene, ethylene-propylene copolymer, ethylene-butene copolymer, and propylene-butene copolymer can be mentioned, and the primer composition of the present invention can preferably be used to these molded products.

Further, the primer composition of the present invention for coating can also preferably be used not only to a molded product comprising a polyolefin resin but also to a resin plate (or sheet) comprising an acrylic resin such as a polymethyl methacrylate, a molded product comprising a polypropylene and a synthetic rubber, and molded product for parts of automobile such as a bumper or molded product for household electrical appliance comprising a polyamide resin, unsaturated polyester resin, polybutylene terephthalate resin, or polycarbonate resin.

In this connection, a molded product to which a coating by using a primer composition of the present invention is carried out may be a product molded by any known molding method such as an injection molding, compression molding, blow molding, extrusion molding, and rotational molding.

EXAMPLES

Now, the present invention is described in more detail with reference to Synthesis Examples, Examples, and Comparative Examples.

In the Synthesis Examples described below, chemical compositions and number average molecular weight of the polymers synthesized are determined and evaluated by the methods described below:

Chemical Composition of Polymer:

Chemical compositions of synthesized polymers were determined by using $^1$H-NMR (produced by Japan Electronics Co., Ltd.; trade name: JNM-EX270).

Number Average Molecular Weight of Polymer:

Number average molecular weights of synthesized polymers were determined by using GPC (produced by Waters Corp.; trade name: GPC 150-C) and employing a polymethyl methacrylate as standard.

In Synthesis Examples 1 to 26, polymers included in the group of the polymer (A) were synthesized.

Synthesis Example 1

In a 1 liter flask provided with a condensing tube, 450 parts by mass of 4-t-butylcyclohexyl mathacrylate and 230 parts by mass of toluene were charged, and the atmosphere in the flask was substituted with nitrogen gas by bubbling the nitrogen gas. Next, after 6 parts by mass of 2,2'-azobisisobutyronitrile was added, the interior temperature of the flask was raised up to 80° C., and the mixture in the flask was maintained at the same temperature for 8 hours to complete the polymerization. After 1,000 parts by mass of toluene was added to the solution of the polymer thus obtained to completely dissolve the polymer, it was introduced in 20,000 parts by mass of methanol, and then the precipitate was filtered off to obtain a white solid. After the white solid was washed with methanol, it was purified by drying under a reduced pressure to obtain polymer (A-1). This polymer had a number average molecular weight of 39,000.

Synthesis Example 2

Synthesis Example 1 was repeated in the same manner with the exception that 420 parts by mass of 4-t-butylcyclohexyl acrylate and 210 parts by mass of toluene were charged, instead of 450 parts by mass of 4-t-butylcyclohexyl methacrylate and 230 parts by mass of toluene, to obtain polymer (A-2). This polymer had a number average molecular weight of 12,000.

Synthesis Example 3

Synthesis Example 1 was repeated in the same manner with the exception that 350 parts by mass of cyclohexyl methacrylate and 180 parts by mass of toluene were charged instead of 450 parts by mass of 4-t-butylcyclohexyl methacrylate and 230 parts by mass of toluene to obtain polymer (A-3). This polymer had a number average molecular weight of 35,000.

Synthesis Example 4

Synthesis Example 1 was repeated in the same manner with the exception that 276 parts by mass of tricyclodecanyl acrylate (produced by Hitachi Chemical; trade name: FANCRYL 513A) and 120 parts by mass of toluene were charged instead of 450 parts by mass of 4-t-butylcyclohexyl methacrylate and 230 parts by mass of toluene, and that the amount of the 2,2'-azobisisobutyronitrile to be added was changed to 3 parts by mass to obtain polymer (A-4). This polymer had a number average molecular weight of 12,000.

Synthesis Example 5

Synthesis Example 1 was repeated in the same manner with the exception that 450 parts by mass of 4-t-butylcyclohexyl methacrylate, 210 parts by mass of a mixture of lauryl methacrylate and dodecyl mathacrylate (produced by Mitsubishi Rayon Co., Ltd.; trade name: Acryester SL), and 270 parts by mass of toluene were charged instead of 450 parts by mass of 4-t-butylcyclohexyl methacrylate and 230 parts by mass of toluene to obtain copolymer (A-5).

The copolymer (A-5) thus obtained had a chemical composition of 4-t-butylcyclohexyl methacrylate/mixture of lauryl methacrylate and dodecyl methacrylate=59/41 (% by mass). Further, this copolymer had a number average molecular weight of 40,000.

Synthesis Example 6

Synthesis Example 1 was repeated in the same manner with the exception that 450 parts by mass of 4-t-butylcyclohexyl acrylate, 210 parts by mass of a mixture of lauryl methacrylate and dodecyl mathacrylate (produced by Mitsubishi Rayon Co., Ltd.; trade name: Acryester SL), and 270 parts by mass of toluene were charged instead of 450 parts by mass of 4-t-butylcyclohexyl methacrylate and 230 parts by mass of toluene to obtain copolymer (A-6).

The copolymer (A-6) thus obtained had a chemical composition of 4-t-butylcyclohexyl acrylate/mixture of lauryl methacrylate and dodecyl methacrylate=64/36 (% by mass). Further, this copolymer had a number average molecular weight of 42,000.

Synthesis Example 7

Synthesis Example 1 was repeated in the same manner with the exception that 100 parts by mass of 3,3,5-trimethylcyclohexyl acrylate was charged instead of 450 parts by mass of 4-t-butylcyclohexyl methacrylate to obtain polymer (A-7). This polymer had a number average molecular weight of 14,000.

Synthesis Example 8

Synthesis Example 1 was repeated in the same manner with the exception that 360 parts by mass of 4-t-butylcyclohexyl methacrylate, 40 parts by mass of methyl methacrylate (MMA), and 200 parts by mass of toluene were charged instead of 450 parts by mass of 4-t-butylcyclohexyl methacrylate and 230 parts by mass of toluene to obtain copolymer (A-8).

The copolymer (A-8) thus obtained had a chemical composition of 4-t-butylcyclohexyl methacrylate/MMA=84/16 (% by mass). Further, this copolymer had a number average molecular weight of 39,000.

Synthesis Example 9

Synthesis Example 1 was repeated in the same manner with the exception that 320 parts by mass of 4-t-butylcyclohexyl acrylate, 56 parts by mass of methyl methacrylate (MMA), 8 parts by mass of styrene (St), 16 parts by mass of dodecyl methacrylate, and 200 parts by mass of toluene were charged instead of 450 parts by mass of 4-t-butylcyclohexyl methacrylate and 230 parts by mass of toluene to obtain copolymer (A-9).

The copolymer (A-9) thus obtained had a chemical composition of 4-t-butylcyclohexyl acrylate/MMA/St/dodecyl methacrylate=80/14/4/2 (% by mass). Further, this copolymer had a number average molecular weight of 41,000.

Synthesis Example 10

Synthesis Example 1 was repeated in the same manner with the exception that 320 parts by mass of 4-t-butylcyclohexyl methacrylate, 56 parts by mass of methyl methacrylate (MMA), 8 parts by mass of styrene (St), 16 parts by mass of dodecyl methacrylate, and 200 parts by mass of toluene were charged instead of 450 parts by mass of 4-t-butylcyclohexyl methacrylate and 230 parts by mass of toluene to obtain copolymer (A-10).

The copolymer (A-10) thus obtained had a chemical composition of 4-t-butylcyclohexyl methacrylate/MMA/St/dodecyl methacrylate=80/14/4/2 (% by mass). Further, this copolymer had a number average molecular weight of 38,000.

Synthesis Example 11

Synthesis Example 1 was repeated in the same manner with the exception that 420 parts by mass of 3,5,5-trimethylcyclohexyl methacrylate and 210 parts by mass of toluene were charged instead of 450 parts by mass of 4-t-butylcyclohexyl methacrylate and 230 parts by mass of toluene to obtain copolymer (A-11).

This copolymer had a number average molecular weight of 28,000.

Synthesis Example 12

Synthesis Example 1 was repeated in the same manner with the exception that 450 parts by mass of 3,5,5-trimethylcyclohexyl methacrylate, 210 parts by mass of a mixture of lauryl methacrylate and dodecyl methacrylate (produced by Mitsubishi Rayon Co., Ltd.; trade name: Acryester SL), and 270 parts by mass of toluene were charged instead of 450 parts by mass of 4-t-butylcyclohexyl methacrylate and 230 parts by mass of toluene to obtain copolymer (A-12).

The copolymer (A-12) thus obtained had a chemical composition of 3,5,5-trimethylcyclohexyl methacrylate/mixture of lauryl methacrylate and dodecyl methacrylate=71/29 (% by mass). Further, this copolymer had a number average molecular weight of 41,000.

Synthesis Example 13

Synthesis Example 1 was repeated in the same manner with the exception that 360 parts by mass of 4-t-butylcyclohexyl acrylate and 90 parts by mass of methyl methacrylate (MMA) were charged instead of 450 parts by mass of 4-t-butylcyclohexyl methacrylate to obtain copolymer (A-13).

The copolymer (A-13) thus obtained had a chemical composition of 4-t-butylcyclohexyl acrylate/MMA=80/20 (% by mass). Further, this copolymer had a number average molecular weight of 35,000.

Synthesis Example 14

Synthesis Example 1 was repeated in the same manner with the exception that 360 parts by mass of 4-t-butylcyclohexyl acrylate and 90 parts by mass of n-butyl acrylate (BA) were charged instead of 450 parts by mass of 4-t-butylcyclohexyl methacrylate to obtain copolymer (A-14).

The copolymer (A-14) thus obtained had a chemical composition of 4-t-butylcyclohexyl acrylate/BA=80/20 (% by mass). Further, this copolymer had a number average molecular weight of 38,000.

Synthesis Example 15

Synthesis Example 1 was repeated in the same manner with the exception that 360 parts by mass of 4-t-butylcyclohexyl acrylate and 90 parts by mass of styrene (St) were charged instead of 450 parts by mass of 4-t-butylcyclohexyl methacrylate to obtain copolymer (A-15).

The copolymer (A-15) thus obtained had a chemical composition of 4-t-butylcyclohexyl acrylate/St=80/20 (% by mass). Further, this copolymer had a number average molecular weight of 36,000.

Synthesis Example 16

Synthesis Example 1 was repeated in the same manner with the exception that 405 parts by mass of 4-t-butylcyclohexyl acrylate and 45 parts by mass of 2-hydroxyethyl acrylate (HEA) were charged instead of 450 parts by mass of 4-t-butylcyclohexyl methacrylate to obtain copolymer (A-16).

The copolymer (A-16) thus obtained had a chemical composition of 4-t-butylcyclohexyl acrylate/HEA=90/10 (% by mass). Further, this copolymer had a number average molecular weight of 21,000.

Synthesis Example 17

Synthesis Example 1 was repeated in the same manner with the exception that 360 parts by mass of 4-t-butylcyclohexyl acrylate and 90 parts by mass of 2-hydroxyethyl acrylate (HEA) were charged instead of 450 parts by mass of 4-t-butylcyclohexyl methacrylate to obtain copolymer (A-17).

The copolymer (A-17) thus obtained had a chemical composition of 4-t-butylcyclohexyl acrylate/HEA=81/19 (% by mass). Further, this copolymer had a number average molecular weight of 27,000.

Synthesis Example 18

Synthesis Example 1 was repeated in the same manner with the exception that 405 parts by mass of 4-t-butylcyclohexyl acrylate, 40.5 parts by mass of 2-hydroxyethyl acrylate (HEA), and 4.5 parts by mass of methacrylic acid were charged instead of 450 parts by mass of 4-t-butylcyclohexyl methacrylate, to obtain copolymer (A-18).

The copolymer (A-18) thus obtained had a chemical composition of 4-t-butylcyclohexyl acrylate/HEA/methacrylic acid=90/9/1 (% by mass). Further, this copolymer had a number average molecular weight of 36,000.

Synthesis Example 19

Synthesis Example 1 was repeated in the same manner with the exception that 405 parts by mass of 4-t-butylcyclohexyl acrylate and 45 parts by mass of 4-hydroxybutyl acrylate (4HBA) were charged instead of 450 parts by mass of 4-t-butylcyclohexyl methacrylate to obtain copolymer (A-19).

The copolymer (A-19) thus obtained had a chemical composition of 4-t-butylcyclohexyl acrylate/4HBA=90/10 (% by mass). Further, this copolymer had a number average molecular weight of 20,000.

Synthesis Example 20

Synthesis Example 1 was repeated in the same manner with the exception that 405 parts by mass of 4-t-butylcyclohexyl acrylate, 40.5 parts by mass of 4-hydroxybutyl acrylate (4HBA), and 4.5 parts by mass of methacrylic acid were charged instead of 450 parts by mass of 4-t-butylcyclohexyl methacrylate to obtain copolymer (A-20).

The copolymer (A-20) thus obtained had a chemical composition of 4-t-butylcyclohexyl acrylate/4HBA/methacrylic acid=90/9/1 (% by mass). Further, this copolymer had a number average molecular weight of 26,000.

Synthesis Example 21

Synthesis Example 1 was repeated in the same manner with the exception that 405 parts by mass of 4-t-butylcyclohexyl acrylate and 45 parts by mass of the adduct of 2-hydroxyethyl methacrylate with one molecule of ε-caprolactone (produced by Daicel Chemical Industries Ltd.; trade name: FM-1) were charged instead of 450 parts by mass of 4-t-butylcyclohexyl methacrylate to obtain copolymer (A-21).

The copolymer (A-21) thus obtained had a chemical composition of 4-t-butylcyclohexyl acrylate/FM-1=90/10 (% by mass). Further, this copolymer had a number average molecular weight of 24,000.

Synthesis Example 22

Synthesis Example 1 was repeated in the same manner with the exception that 405 parts by mass of 4-t-butylcyclohexyl acrylate and 45 parts by mass of the adduct of 2-hydroxyethyl methacrylate with two molecules of ε-caprolactone (produced by Daicel Chemical Industries Ltd.; trade name: FM-2) were charged instead of 450 parts by mass of 4-t-butylcyclohexyl methacrylate to obtain copolymer (A-22).

The copolymer (A-22) thus obtained had a chemical composition of 4-t-butylcyclohexyl acrylate/FM-2=90/10 (% by mass). Further, this copolymer had a number average molecular weight of 21,000.

Synthesis Example 23

Synthesis Example 1 was repeated in the same manner with the exception that 405 parts by mass of 4-t-butylcyclohexyl acrylate and 45 parts by mass of 1,4-cyclohexanedimethanol acrylate (produced by Nippon Kasei Chemical Co., Ltd.; trade name: CHDMMA) were charged instead of 450 parts by mass of 4-t-butylcyclohexyl methacrylate to obtain copolymer (A-23).

The copolymer (A-23) thus obtained had a chemical composition of 4-t-butylcyclohexyl acrylate/CHDMMA=90/10 (% by mass). Further, this copolymer had a number average molecular weight of 30,000.

Synthesis Example 24

In a 1 liter flask provided with a condensing tube, 220 parts by mass of t-butyl methacrylate and 110 parts by mass of toluene were added, and the atmosphere in the flask was substituted with nitrogen gas by bubbling the nitrogen gas. Next, after 0.3 part by mass of 2,2'-azobis(2,4-dimethyl-4-methoxyvaleronitrile) was added, the flask was maintained at room temperature for 24 hours to complete the polymerization. After 1,000 parts by mass of toluene was further added to the solution of the polymer thus obtained to completely dissolve the polymer, it was introduced in 20,000 parts by mass of methanol, and then the precipitate was filtered off to obtain a white solid. After the white solid was washed with methanol, it was dried under a reduced pressure to obtain a purified polymer (A-24). This polymer had a number average molecular weight of 189,000.

Synthesis Example 25

In a 1 liter flask provided with a condensing tube, 220 parts by mass of t-butyl methacrylate, 210 parts by mass of lauryl methacrylate, and 350 parts by mass of toluene were added, and the atmosphere in the flask was substituted with nitrogen gas by bubbling the nitrogen gas. Next, after 0.3 part by mass of 2,2'-azobis(2,4-dimethyl-4-methoxyvaleronitrile) was added, the flask was maintained at room temperature for 24 hours to complete the polymerization. After 1,000 parts by mass of toluene was further added to the solution of the polymer thus obtained to completely dissolve the polymer, it was introduced in 20,000 parts by mass of methanol, and then the precipitate was filtered off to obtain a white solid. After the white solid was washed with methanol, it was dried under a reduced pressure to obtain a purified copolymer (A-25).

The copolymer (A-25) thus obtained had a chemical composition of t-butyl methacrylate/lauryl methacrylate=58/42 (mass ratio). Further, this copolymer had a number average molecular weight of 164,000.

Synthesis Example 26

In a 1 liter flask provided with a condensing tube, 300 parts by mass of 4-t-butylcyclohexyl acrylate, 170 parts by mass of 1-hexene, and 500 parts by mass of toluene were added, and the atmosphere in the flask was substituted with nitrogen gas by bubbling the nitrogen gas. Next, after 6 parts by mass of 2,2'-azobisisobutyronitrile was added, the temperature of the mixture in the flask was raised, and the interior temperature of the flask was maintained at 80° C. for 8 hours to complete the polymerization. After 1,000 parts by mass of toluene was further added to the solution of the polymer thus obtained to completely dissolve the polymer, it was introduced in 20,000 parts by mass of methanol, and then the precipitate was filtered off to obtain a white solid. After the white solid was washed with methanol, it was dried under a reduced pressure to obtain a purified copolymer (A-26).

The copolymer (A-26) thus obtained had a chemical composition of 4-t-butylcyclohexyl acrylate/1-hexene=84/16 (mass ratio). Further, this copolymer had a number average molecular weight of 14,000.

Synthesis Example 27

For comparison, Synthesis Example 1 was repeated with the exception that 420 parts by mass of benzyl methacrylate and 210 parts by mass of toluene were charged instead of 450 parts by mass of 4-t-butylcyclohexyl methacrylate and 230 parts by mass of toluene to obtain polymer (E-1) which is not included in the group of polymer (A). The polymer (E-1) had a number average molecular weight of 48,000.

Synthesis Example 28

For comparison, Synthesis Example 1 was repeated with the exception that 420 parts by mass of isobutyl methacrylate and 210 parts by mass of toluene were charged, instead of 450 parts by mass of 4-t-butylcyclohexyl methacrylate and 230 parts by mass of toluene to obtain polymer (E-2) which is not included in the group of polymer (A). The polymer (E-2) had a number average molecular weight of 32,000.

Synthesis Example 29

For comparison, Synthesis Example 1 was repeated with the exception that 420 parts by mass of 2-phenylethyl methacrylate and 210 parts by mass of toluene were charged instead of 450 parts by mass of 4-t-butylcyclohexyl methacrylate and 230 parts by mass of toluene to obtain polymer (E-3) which is not included in the group of polymer (A). The polymer (E-3) had a number average molecular weight of 42,000.

Now, in relation to the Examples and Comparative Examples, each abbreviation used in Tables 1 to 25 shown below indicates the following compound or mixture, respectively:

PMMA: Acrylic resin (produced by Mitsubishi Rayon Co., Ltd.; trade name: Acrypet VH)

MMA/St/dodecyl methacrylate: Copolymer of methyl methacrylate/styrene/dodecyl methacrylate=70/10/20 (% by mass), (number average molecular weight: 50,000)

PP: Polypropylene (produced by Japan Polychem Corporation; trade name: NOVATEC FA3DA)

EPB: Ethylene-propylene-1-butene copolymer (produced by Degussa-Hüls Japan; trade name: VESTOPLAST 792)

SEBS: Styrene-ethylene.buthylene-styrene triblock copolymer (the ratio of hydrogenated portions in conjugated diene portion is 98%, and the amount of vinyl bond before hydrogenation is 75%) (produced by Asahi Chemical Ind.; trade name: Tuftec H1221)

Mixed solvent X: Mixed solvent of toluene/xylene/methyl ethyl ketone/Supersol 1500=30/30/10/30 (produced by New Japan Petrochemical Co., Ltd.; content of C9 aromatic hydrocarbon is 95% by mass)

Mixed solvent Y: Mixed solvent of butyl acetate/cyclohexane=30/70 (% by mass)

<Evaluation of Adhesive Properties to Substrate>

In each of the following Examples and Comparative Examples, adhesive properties of a primer composition to a substrate were evaluated by the method as described below. In this connection, "parts" shown in the Tables means parts by mass.

Examples 1 to 124

Only one of the polymers (A-1) to (A-26) obtained by Synthesis Examples 1 to 26, or one of the polymers (A-1) to (A-26) and another polymer (B) were dissolved in a solvent to obtain a primer composition for coating, respectively. The type of polymer and solvent used, and the amount of each component blended are shown in Tables 1 to 22.

A primer composition obtained was applied on a substrate by a spray, allowed to stand at room temperature for 15 minutes, and then dried in a drier preset at 80° C. for 30 minutes to form a coated film having a thickness of 30 μm. The film was cut, as it is still adhered on the surface of the substrate, in such a pattern as that of the squares of a "Go" board (1 mm distance, 100 squares), and subjected to the evaluation of adhesive properties by determining the degree of adhesion (number of squares remained on the surface of the substrate) in a peel test using a Cellophane® tape according to JIS K 5400.

As the substrate, an acrylic resin plate (hereinafter including the Tables, refereed to as "PMMA substrate") (flat plate of 3 mm thickness) prepared by injection molding an "Acrypet VH"® (acrylic resin produced by Mitsubishi Rayon Co., Ltd.); or a polypropylene resin plate (hereinafter including the Tables, referred to as "PP substrate") (flat plate of 3 mm thickness) prepared by injection molding NOVATEC FA3DA (polypropylene resin produced by Japan Polychem Corporation) was used.

Comparative Examples 1 to 15

Only one of the polymers (E-1) to (E-3) obtained by Synthesis Examples 27 to 29, or one of the polymers (E-1) to (E-3) and another polymer (B) were dissolved in a solvent to obtain a comparative primer composition for coating, respectively. The type of polymer and solvent used, the amount of each component blended, and the results of the evaluation are shown in Table 23. The method for applying the comparative primer composition and the method for evaluation, and the type of the substrate used were the same as those in the Examples described above.

Comparative Example 16

A commercially available acrylic resin (Acrypet VH® produced by Mitsubishi Rayon Co., Ltd.) was dissolved in toluene so that the concentration of the acrylic resin in the toluene becomes 5% by mass to obtain a comparative primer composition. The method for applying the comparative primer composition and the method for evaluation, and the type of the substrate used were the same as those in the Examples described above. Chemical composition of the comparative primer composition and the result of the evaluation are shown in Table 24.

Comparative Example 17

A commercially available polypropylene (produced by Japan Polychem Corporation; trade name: NOVATEC FA3DA) was dissolved in xylene so that the concentration of the polypropylene in the xylene becomes 5% by mass to obtain a comparative primer composition. The method for applying the comparative primer composition and the method for evaluation, and the type of the substrate used were the same as those in the Examples described above. Chemical composition of the comparative primer composition and the result of the evaluation are shown in Table 24.

Results obtained in the Examples and Comparative Examples described above are shown in Tables 1 to 24 in which the total number (100) of the squares subjected to peel test and the number of the squares remained on the surface of a substrate are shown as the denominator and numerator, respectively, in the column of adhesive properties to substrate, as the results of the evaluation.

As shown in Tables 1 to 22, in each of Examples 1 to 124 wherein a primer composition for coating was prepared by blending, as solid component, only at least one of the polymers (A-1) to (A-26) having a unit of a (meth)acrylic ester monomer (a) in which acryloyloxy group or methacryloyloxy group is bonded to secondary carbon atom or tertiary carbon atom, or one of the polymers (A-1) to (A-26) and another polymer (B) different from the group of the polymer (A) are blended, every primer composition obtained exhibited excellent adhesive properties to both a PMMA substrate and a PP substrate.

In contrast to this result, as shown in Table 23, in each of Comparative Examples 1 to 15 wherein a primer composition for coating was prepared by blending one of the polymers (E-1) to (E-3) instead of a polymer (A), every composition obtained exhibited excellent adhesive properties to a PMMA substrate, but the adhesive properties to a PP substrate were utterly poor.

Besides, as shown in Table 24, in Comparative Example 16 wherein a primer composition for coating was prepared by dissolving an acrylic resin in toluene, the composition exhibited excellent adhesive properties to a PMMA substrate like in Comparative Examples 1 to 15, but the adhesive properties to a PP substrate were utterly poor.

Also, as shown in Table 24, in Comparative Example 17 wherein a primer composition for coating was prepared by dissolving a polypropylene in xylene, the composition exhibited excellent adhesive properties to a PP substrate, but the adhesive properties to a PMMA substrate were utterly poor.

<Test for Evaluating Adhesion Peel Strength>

(Preparation of Test Piece)

Polymers obtained in the Synthesis Examples 1 to 29 were dissolved in toluene so that the concentration of the polymer in the toluene becomes 20% by mass, respectively, to prepare solutions used for determining adhesion peel strength. The solutions each in an amount of 20 μL were applied at the center portions of two polypropylene substrates (produced by Japan Polychem Corporation; trade name: NOVATEC FA3DA; ISO board; 64×12.6×6 mm). The substrates (1, 1) were piled up as shown in FIG. 1 so that the substrates are disposed in crosswise relationship (size of adhered area (2): 12.6×12.6 mm). Then, the substrates were allowed to stand under a load of 500 g at room temperature for 15 minutes, and then dried in a drier preset at 80° C. for 30 minutes to form a test piece for adhesion peel test.

(Adhesion Peel Test)

Figure 2:
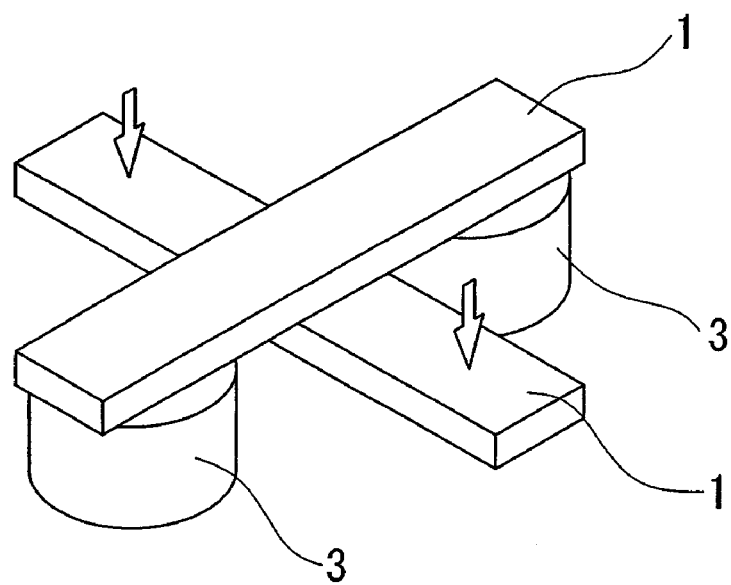
FIG. 2 shows an angular perspective view illustrating the state of the adhesion peel test.

Adhesion strength of a primer composition for coating was determined by using a Tensilon UTM-1-2500 (produced by Toyo Baldwin Co., Ltd.). Specifically, as shown in FIG. 2, the both ends of the upper substrate of the adhesion test piece were placed on fixtures (3, 3), respectively. Then, a force was applied on the two portions of the lower substrate and the adhesion strength at that time was determined. Peel rate was preset at 2 mm/min. The test results are shown in Table 25.

(Results of Adhesion Peel Test)

As will be understood from Table 25, the adhesion strength of primer compositions containing one of polymers (A-1) to (A-26) obtained in Synthesis Examples 1 to 26, respectively, to a polypropylene substrate was higher than 294 kPa. On the other hand, the adhesion strength of the primer compositions containing one of the polymers (E-1) to (E-3) obtained in Synthesis Examples 27 to 29, respectively, to a polypropylene substrate was as remarkably low as about 98 kPa.

TABLE 1

| | Composition | | | Adhesive properties to substrate | |
|---|---|---|---|---|---|
| | Polymer (A) (parts) | Polymer (B) (parts) | Solvent (parts) | PP substrate | PMMA substrate |
| Referential Ex. 1 | (A-1) 20 | — | Toluene 80 | 100/100 | 100/100 |
| Referential Ex. 2 | (A-1) 18 | PMMA 2 | Toluene 80 | 100/100 | 100/100 |
| Referential Ex. 3 | (A-1) 14 | PMMA 6 | Toluene 80 | 100/100 | 100/100 |
| Referential Ex. 4 | (A-1) 10 | PMMA 10 | Toluene 80 | 100/100 | 100/100 |
| Referential Ex. 5 | (A-1) 18 | PMMA 2 | Xylene 80 | 100/100 | 100/100 |
| Referential Ex. 6 | (A-1) 18 | PMMA 2 | Mixed solvent X 80 | 100/100 | 100/100 |
| Referential Ex. 7 | (A-1) 18 | MMA/St/dodecyl methacrylate 2 | Toluene 80 | 100/100 | 100/100 |
| Referential Ex. 8 | (A-1) 14 | MMA/St/dodecyl methacrylate 6 | Toluene 80 | 100/100 | 100/100 |
| Referential Ex. 9 | (A-1) 16 | MMA/St/dodecyl methacrylate 2 | Toluene 80 | 100/100 | 100/100 |
| Referential Ex. 10 | (A-1) 14 | PMMA 2   MMA/St/dodecyl methacrylate 4 | Toluene 80 | 100/100 | 100/100 |

TABLE 2

| | Composition | | | Adhesive properties to substrate | |
|---|---|---|---|---|---|
| | Polymer (A) (parts) | Polymer (B) (parts) | Solvent (parts) | PP substrate | PMMA substrate |
| Ex. 11 | (A-2) 20 | — | Toluene 80 | 100/100 | 100/100 |
| Ex. 12 | (A-2) 18 | PMMA 2 | Toluene 80 | 100/100 | 100/100 |
| Ex. 13 | (A-2) 14 | PMMA 6 | Toluene 80 | 100/100 | 100/100 |
| Ex. 14 | (A-2) 10 | PMMA 10 | Toluene 80 | 100/100 | 100/100 |
| Ex. 15 | (A-2) 18 | PMMA 2 | Xylene 80 | 100/100 | 100/100 |
| Ex. 16 | (A-2) 18 | PMMA 2 | Mixed solvent X 80 | 100/100 | 100/100 |

TABLE 2-continued

| | Composition | | | Adhesive properties to substrate | |
|---|---|---|---|---|---|
| | Polymer (A) (parts) | Polymer (B) (parts) | Solvent (parts) | PP substrate | PMMA substrate |
| Ex. 17 | (A-2) 18 | MMA/St/dodecyl methacrylate 2 | Toluene 80 | 100/100 | 100/100 |
| Ex. 18 | (A-2) 14 | MMA/St/dodecyl methacrylate 6 | Toluene 80 | 100/100 | 100/100 |
| Ex. 19 | (A-2) 16 | PMMA 2 MMA/St/dodecyl methacrylate 2 | Toluene 80 | 100/100 | 100/100 |
| Ex. 20 | (A-2) 14 | PMMA 2 MMA/St/dodecyl methacrylate 4 | Toluene 80 | 100/100 | 100/100 |

TABLE 3

| | Composition | | | Adhesive properties to substrate | |
|---|---|---|---|---|---|
| | Polymer (A) (parts) | Polymer (B) (parts) | Solvent (parts) | PP substrate | PMMA substrate |
| Referential Ex. 11 | (A-3) 20 | — | Toluene 80 | 100/100 | 100/100 |
| Referential Ex. 12 | (A-3) 18 | PMMA 2 | Toluene 80 | 100/100 | 100/100 |
| Referential Ex. 13 | (A-3) 18 | PMMA 2 | Mixed solvent X 80 | 100/100 | 100/100 |
| Referential Ex. 14 | (A-3) 18 | MMA/St/dodecyl methacrylate 2 | Toluene 80 | 100/100 | 100/100 |
| Referential Ex. 15 | (A-3) 16 | PMMA 2 MMA/St/dodecyl methacrylate 2 | Toluene 80 | 100/100 | 100/100 |

TABLE 4

| | Composition | | | Adhesive properties to substrate | |
|---|---|---|---|---|---|
| | Polymer (A) (parts) | Polymer (B) (parts) | Solvent (parts) | PP substrate | PMMA substrate |
| Ex. 26 | (A-4) 20 | — | Toluene 80 | 100/100 | 100/100 |
| Ex. 27 | (A-4) 18 | PMMA 2 | Toluene 80 | 100/100 | 100/100 |
| Ex. 28 | (A-4) 18 | PMMA 2 | Mixed solvent X 80 | 100/100 | 100/100 |

TABLE 4-continued

| | Composition | | | Adhesive properties to substrate | |
|---|---|---|---|---|---|
| | Polymer (A) (parts) | Polymer (B) (parts) | Solvent (parts) | PP substrate | PMMA substrate |
| Ex. 29 | (A-4) 18 | MMA/St/dodecyl methacrylate 2 | Toluene 80 | 100/100 | 100/100 |
| Ex. 30 | (A-4) 16 | PMMA 2 MMA/St/dodecyl methacrylate 2 | Toluene 80 | 100/100 | 100/100 |

TABLE 5

| | Composition | | | Adhesive properties to substrate | |
|---|---|---|---|---|---|
| | Polymer (A) (parts) | Polymer (B) (parts) | Solvent (parts) | PP substrate | PMMA substrate |
| Referential Ex. 16 | (A-5) 20 | — | Toluene 80 | 100/100 | 100/100 |
| Referential Ex. 17 | (A-5) 18 | PMMA 2 | Toluene 80 | 100/100 | 100/100 |
| Referential Ex. 18 | (A-5) 18 | PMMA 2 | Mixed solvent X 80 | 100/100 | 100/100 |
| Referential Ex. 19 | (A-5) 18 | MMA/St/dodecyl methacrylate 2 | Toluene 80 | 100/100 | 100/100 |
| Referential Ex. 20 | (A-5) 16 | PMMA 2 MMA/St/dodecyl methacrylate 2 | Toluene 80 | 100/100 | 100/100 |

TABLE 6

| | Composition | | | Adhesive properties to substrate | |
|---|---|---|---|---|---|
| | Polymer (A) (parts) | Polymer (B) (parts) | Solvent (parts) | PP substrate | PMMA substrate |
| Referential Ex. 21 | (A-6) 20 | — | Toluene 80 | 100/100 | 100/100 |
| Referential Ex. 22 | (A-6) 18 | PMMA 2 | Toluene 80 | 100/100 | 100/100 |
| Referential Ex. 23 | (A-6) 18 | PMMA 2 | Mixed solvent X 80 | 100/100 | 100/100 |
| Referential Ex. 24 | (A-6) 18 | MMA/St/dodecyl methacrylate 2 | Toluene 80 | 100/100 | 100/100 |
| Referential Ex. 25 | (A-6) 16 | PMMA 2 MMA/St/dodecyl methacrylate 2 | Toluene 80 | 100/100 | 100/100 |

TABLE 7

| | Composition | | | Adhesive properties to substrate | |
|---|---|---|---|---|---|
| | Polymer (A) (parts) | Polymer (B) (parts) | Solvent (parts) | PP substrate | PMMA substrate |
| Ex. 41 | (A-7) 20 | — | Toluene 80 | 100/100 | 100/100 |

TABLE 8

| | Composition | | | Adhesive properties to substrate | |
|---|---|---|---|---|---|
| | Polymer (A) (parts) | Polymer (B) (parts) | Solvent (parts) | PP substrate | PMMA substrate |
| Referential Ex. 26 | (A-8) 20 | — | Toluene 80 | 100/100 | 100/100 |
| Referential Ex. 27 | (A-8) 18 | PMMA 2 | Toluene 80 | 100/100 | 100/100 |
| Referential Ex. 28 | (A-8) 18 | PMMA 2 | Mixed solvent X 80 | 100/100 | 100/100 |
| Referential Ex. 29 | (A-8) 18 | MMA/St/dodecyl methacrylate 2 | Toluene 80 | 100/100 | 100/100 |
| Referential Ex. 30 | (A-8) 16 | PMMA 2 MMA/St/dodecyl methacrylate 2 | Toluene 80 | 100/100 | 100/100 |

TABLE 9

| | Composition | | | Adhesive properties to substrate | |
|---|---|---|---|---|---|
| | Polymer (A) (parts) | Polymer (B) (parts) | Solvent (parts) | PP substrate | PMMA substrate |
| Ex. 47 | (A-9) 20 | — | Toluene 80 | 100/100 | 100/100 |
| Ex. 48 | (A-9) 18 | PMMA 2 | Toluene 80 | 100/100 | 100/100 |
| Ex. 49 | (A-9) 18 | PMMA 2 | Mixed solvent X 80 | 100/100 | 100/100 |
| Ex. 50 | (A-9) 18 | MMA/St/dodecyl methacrylate 2 | Toluene 80 | 100/100 | 100/100 |
| Ex. 51 | (A-9) 16 | PMMA 2 MMA/St/dodecyl methacrylate 2 | Toluene 80 | 100/100 | 100/100 |

TABLE 10

| | Composition | | | Adhesive properties to substrate | |
|---|---|---|---|---|---|
| | Polymer (A) (parts) | Polymer (B) (parts) | Solvent (parts) | PP substrate | PMMA substrate |
| Referential Ex. 31 | (A-10) 20 | — | Toluene 80 | 100/100 | 100/100 |
| Referential Ex. 32 | (A-10) 18 | PMMA 2 | Toluene 80 | 100/100 | 100/100 |
| Referential Ex. 33 | (A-10) 18 | PMMA 2 | Mixed solvent X 80 | 100/100 | 100/100 |
| Referential Ex. 34 | (A-10) 18 | MMA/St/dodecyl methacrylate 2 | Toluene 80 | 100/100 | 100/100 |
| Referential Ex. 35 | (A-10) 16 | PMMA 2 MMA/St/dodecyl methacrylate 2 | Toluene 80 | 100/100 | 100/100 |

TABLE 11

| | Composition | | | Adhesive properties to substrate | |
|---|---|---|---|---|---|
| | Polymer (A) (parts) | Polymer (B) (parts) | Solvent (parts) | PP substrate | PMMA substrate |
| Referential Ex. 36 | (A-11) 20 | — | Toluene 80 | 100/100 | 100/100 |
| Referential Ex. 37 | (A-11) 18 | PMMA 2 | Toluene 80 | 100/100 | 100/100 |
| Referential Ex. 38 | (A-11) 18 | PMMA 2 | Mixed solvent X 80 | 100/100 | 100/100 |
| Referential Ex. 39 | (A-11) 18 | MMA/St/dodecyl methacrylate 2 | Toluene 80 | 100/100 | 100/100 |
| Referential Ex. 40 | (A-11) 16 | PMMA 2 MMA/St/dodecyl methacrylate 2 | Toluene 80 | 100/100 | 100/100 |

TABLE 12

| | Composition | | | Adhesive properties to substrate | |
|---|---|---|---|---|---|
| | Polymer (A) (parts) | Polymer (B) (parts) | Solvent (parts) | PP substrate | PMMA substrate |
| Referential Ex. 41 | (A-12) 20 | — | Toluene 80 | 100/100 | 100/100 |

TABLE 12-continued

| | Composition | | | Adhesive properties to substrate | |
|---|---|---|---|---|---|
| | Polymer (A) (parts) | Polymer (B) (parts) | Solvent (parts) | PP substrate | PMMA substrate |
| Referential Ex. 42 | (A-12) 18 | PMMA 2 | Toluene 80 | 100/100 | 100/100 |
| Referential Ex. 43 | (A-12) 18 | PMMA 2 | Mixed solvent X 80 | 100/100 | 100/100 |
| Referential Ex. 44 | (A-12) 18 | MMA/St/dodecyl methacrylate 2 | Toluene 80 | 100/100 | 100/100 |
| Referential Ex. 45 | (A-12) 16 | PMMA 2  MMA/St/dodecyl methacrylate 2 | Toluene 80 | 100/100 | 100/100 |

TABLE 13

| | Composition | | | Adhesive properties to substrate | |
|---|---|---|---|---|---|
| | Polymer (A) (parts) | Polymer (B) (parts) | Solvent (parts) | PP substrate | PMMA substrate |
| Ex. 67 | (A-13) 20 | — | Toluene 80 | 100/100 | 100/100 |
| Ex. 68 | (A-14) 20 | — | Toluene 80 | 100/100 | 100/100 |
| Ex. 69 | (A-15) 20 | — | Toluene 80 | 100/100 | 100/100 |

TABLE 14

| | Composition | | | Adhesive properties to substrate | |
|---|---|---|---|---|---|
| | Polymer (A) (parts) | Polymer (B) (parts) | Solvent (parts) | PP substrate | PMMA substrate |
| Ex. 70 | (A-16) 20 | — | Toluene 80 | 100/100 | 100/100 |
| Ex. 71 | (A-16) 18 | PMMA 2 | Toluene 80 | 100/100 | 100/100 |
| Ex. 72 | (A-16) 18 | MMA/St/dodecyl methacrylate 2 | Toluene 80 | 100/100 | 100/100 |
| Ex. 73 | (A-16) 16 | PMMA 2  MMA/St/dodecyl methacrylate 2 | Toluene 80 | 100/100 | 100/100 |
| Ex. 74 | (A-16) 16 | (A-2) 4 | Mixed solvent Y 80 | 100/100 | 100/100 |
| Ex. 75 | (A-16) 10 | (A-2) 10 | Mixed solvent Y 80 | 100/100 | 100/100 |
| Ex. 76 | (A-16) 5 | (A-2) 15 | Mixed solvent Y 80 | 100/100 | 100/100 |
| Ex. 77 | (A-16) 8 | (A-2) 1  SEBS 1 | Mixed solvent Y 80 | 100/100 | 100/100 |
| Ex. 78 | (A-16) 9 | EPB 1 | Toluene 90 | 100/100 | 100/100 |
| Ex. 79 | (A-16) 9 | PB 1 | Toluene 90 | 100/100 | 100/100 |

TABLE 14-continued

| | Composition | | | Adhesive properties to substrate | |
|---|---|---|---|---|---|
| | Polymer (A) (parts) | Polymer (B) (parts) | Solvent (parts) | PP substrate | PMMA substrate |
| Ex. 80 | (A-16) 7 | SEBS 3 | Mixed solvent Y 90 | 100/100 | 100/100 |

TABLE 15

| | Composition | | | Adhesive properties to substrate | |
|---|---|---|---|---|---|
| | Polymer (A) (parts) | Polymer (B) (parts) | Solvent (parts) | PP substrate | PMMA substrate |
| Ex. 81 | (A-17) 20 | — | Toluene 80 | 100/100 | 100/100 |
| Ex. 82 | (A-17) 18 | MMA/St/dodecyl methacrylate 2 | Toluene 80 | 100/100 | 100/100 |
| Ex. 83 | (A-17) 16 | (A-2) 4 | Mixed solvent Y 80 | 100/100 | 100/100 |
| Ex. 84 | (A-17) 8 | (A-2) 1 | SEBS 1 Mixed solvent Y 90 | 100/100 | 100/100 |
| Ex. 85 | (A-17) 7 | SEBS 3 | Mixed solvent Y 90 | 100/100 | 100/100 |

TABLE 16

| | Composition | | | Adhesive properties to substrate | |
|---|---|---|---|---|---|
| | Polymer (A) (parts) | Polymer (B) (parts) | Solvent (parts) | PP substrate | PMMA substrate |
| Ex. 86 | (A-18) 20 | — | Toluene 80 | 100/100 | 100/100 |
| Ex. 87 | (A-18) 7 | SEBS 3 | Mixed solvent Y 90 | 100/100 | 100/100 |

TABLE 17

| | Composition | | | Adhesive properties to substrate | |
|---|---|---|---|---|---|
| | Polymer (A) (parts) | Polymer (B) (parts) | Solvent (parts) | PP substrate | PMMA substrate |
| Ex. 88 | (A-19) 20 | — | Toluene 80 | 100/100 | 100/100 |
| Ex. 89 | (A-19) 18 | PMMA 2 | Toluene 80 | 100/100 | 100/100 |
| Ex. 90 | (A-19) 16 | PMMA 2 | MMA/St/dodecyl methacrylate 2 Toluene 80 | 100/100 | 100/100 |
| Ex. 91 | (A-19) 16 | (A-2) 4 | — Toluene 80 | 100/100 | 100/100 |
| Ex. 92 | (A-19) 8 | (A-2) 1 | SEBS 1 Toluene 90 | 100/100 | 100/100 |
| Ex. 93 | (A-19) 7 | SEBS 3 | Mixed solvent Y 90 | 100/100 | 100/100 |

TABLE 18

| | Composition | | | Adhesive properties to substrate | |
|---|---|---|---|---|---|
| | Polymer (A) (parts) | Polymer (B) (parts) | Solvent (parts) | PP substrate | PMMA substrate |
| Ex. 94 | (A-20) 20 | — | Toluene 80 | 100/100 | 100/100 |
| Ex. 95 | (A-20) 18 | PMMA 2 | Toluene 80 | 100/100 | 100/100 |
| Ex. 96 | (A-20) 14 (A-2) 6 | — | Mixed solvent Y 80 | 100/100 | 100/100 |
| Ex. 97 | (A-20) 8 (A-2) 1 | SEBS 1 | Mixed solvent Y 90 | 100/100 | 100/100 |
| Ex. 98 | (A-20) 6 (A-2) 3 | SEBS 1 | Mixed solvent Y 90 | 100/100 | 100/100 |
| Ex. 99 | (A-20) 8 | EPB 2 | Toluene 90 | 100/100 | 100/100 |
| Ex. 100 | (A-20) 7 | SEBS 3 | Mixed solvent Y 90 | 100/100 | 100/100 |

TABLE 19

| | Composition | | | Adhesive properties to substrate | |
|---|---|---|---|---|---|
| | Polymer (A) (parts) | Polymer (B) (parts) | Solvent (parts) | PP substrate | PMMA substrate |
| Ex. 101 | (A-21) 20 | — | Toluene 80 | 100/100 | 100/100 |
| Ex. 102 | (A-21) 18 | PMMA 2 | Toluene 80 | 100/100 | 100/100 |
| Ex. 103 | (A-21) 18 | MMA/St/ dodecyl methacrylate 2 | Toluene 80 | 100/100 | 100/100 |
| Ex. 104 | (A-21) 16 (A-2) 4 | — | Mixed solvent Y 80 | 100/100 | 100/100 |
| Ex. 105 | (A-21) 7 (A-2) 2 | SEBS 1 | Mixed solvent Y 90 | 100/100 | 100/100 |
| Ex. 106 | (A-21) 7 | SEBS 3 | Mixed solvent Y 90 | 100/100 | 100/100 |

TABLE 20

| | Composition | | | Adhesive properties to substrate | |
|---|---|---|---|---|---|
| | Polymer (A) (parts) | Polymer (B) (parts) | Solvent (parts) | PP substrate | PMMA substrate |
| Ex. 107 | (A-22) 20 | — | Toluene 80 | 100/100 | 100/100 |
| Ex. 108 | (A-22) 18 | PMMA 2 | Toluene 80 | 100/100 | 100/100 |
| Ex. 109 | (A-22) 18 | MMA/St/ dodecyl methacrylate 2 | Toluene 80 | 100/100 | 100/100 |
| Ex. 110 | (A-22) 16 (A-2) 4 | — | Mixed solvent Y 80 | 100/100 | 100/100 |
| Ex. 111 | (A-22) 8 (A-2) 1 | SEBS 1 | Mixed solvent Y 90 | 100/100 | 100/100 |
| Ex. 112 | (A-22) 7 | SEBS 3 | Mixed solvent Y 90 | 100/100 | 100/100 |

TABLE 21

| | Composition | | | Adhesive properties to substrate | |
|---|---|---|---|---|---|
| | Polymer (A) (parts) | Polymer (B) (parts) | Solvent (parts) | PP substrate | PMMA substrate |
| Ex. 113 | (A-23) 20 | — | Toluene 80 | 100/100 | 100/100 |
| Ex. 114 | (A-23) 18 | PMMA 2 | Toluene 80 | 100/100 | 100/100 |
| Ex. 115 | (A-23) 18 | MMA/St/dodecyl methacrylate 2 | Toluene 80 | 100/100 | 100/100 |
| Ex. 116 | (A-23) 16 (A-2) 4 | — | Mixed solvent Y 80 | 100/100 | 100/100 |
| Ex. 117 | (A-23) 7 | SEBS 3 | Mixed solvent Y 90 | 100/100 | 100/100 |

TABLE 22

| | Composition | | | Adhesive properties to substrate | |
|---|---|---|---|---|---|
| | Polymer (A) (parts) | Polymer (B) (parts) | Solvent (parts) | PP substrate | PMMA substrate |
| Referential Ex. 46 | (A-24) 20 | — | Toluene 80 | 100/100 | 100/100 |
| Referential Ex. 47 | (A-25) 20 | — | Toluene 80 | 100/100 | 100/100 |
| Referential Ex. 48 | (A-26) 20 | — | Toluene 80 | 100/100 | 100/100 |
| Referential Ex. 49 | (A-26) 18 | PMMA 2 | Toluene 80 | 100/100 | 100/100 |
| Referential Ex. 50 | (A-26) 18 | PMMA 2 | Mixed solvent X 80 | 100/100 | 100/100 |
| Referential Ex. 51 | (A-26) 18 | MMA/St/dodecyl methacrylate 2 | Toluene 80 | 100/100 | 100/100 |
| Referential Ex. 52 | (A-26) 16 | PMMA 2 MMA/St/dodecyl methacrylate 2 | Toluene 80 | 100/100 | 100/100 |

TABLE 23

| | Composition | | | Adhesive Properties to substrate | |
|---|---|---|---|---|---|
| | Polymer (E) (parts) | Polymer (B) (parts) | Solvent (parts) | PP substrate | PMMA substrate |
| Compar. Ex. 1 | (E-1) 20 | — | Toluene 80 | 0/100 | 100/100 |
| Compar. Ex. 2 | (E-1) 18 | PMMA 2 | Toluene 80 | 0/100 | 100/100 |
| Compar. Ex. 3 | (E-1) 18 | PMMA 2 | Mixed solvent X 80 | 0/100 | 100/100 |

TABLE 23-continued

| | Composition | | | Adhesive Properties to substrate | |
|---|---|---|---|---|---|
| | Polymer (E) (parts) | Polymer (B) (parts) | Solvent (parts) | PP substrate | PMMA substrate |
| Compar. Ex. 4 | (E-1) 18 | MMA/St/dodecyl methacrylate 2 | Toluene 80 | 0/100 | 100/100 |
| Compar. Ex. 5 | (E-1) 16 | PMMA 2 MMA/St/ dodecyl methacrylate 2 | Toluene 80 | 0/100 | 100/100 |
| Compar. Ex. 6 | (E-2) 20 | — | Toluene 80 | 0/100 | 100/100 |
| Compar. Ex. 7 | (E-2) 18 | PMMA 2 | Toluene 80 | 0/100 | 100/100 |
| Compar. Ex. 8 | (E-2) 18 | PMMA 2 | Mixed solvent X 80 | 0/100 | 100/100 |
| Compar. Ex. 9 | (E-2) 18 | MMA/St/dodecyl methacrylate 2 | Toluene 80 | 0/100 | 100/100 |
| Compar. Ex. 10 | (E-2) 16 | PMMA 2 MMA/St/ dodecyl methacrylate 2 | Toluene 80 | 0/100 | 100/100 |
| Compar. Ex. 11 | (E-3) 20 | — | Toluene 80 | 0/100 | 100/100 |
| Compar. Ex. 12 | (E-3) 18 | PMMA 2 | Toluene 80 | 0/100 | 100/100 |
| Compar. Ex. 13 | (E-3) 18 | PMMA 2 | Mixed solvent X 80 | 0/100 | 100/100 |
| Compar. Ex. 14 | (E-3) 18 | MMA/St/dodecyl methacrylate 2 | Toluene 80 | 0/100 | 100/100 |
| Compar. Ex. 15 | (E-3) 16 | PMMA 2 MMA/St/ dodecyl methacrylate 2 | Toluene 80 | 0/100 | 100/100 |

TABLE 24

| | Composition | | Adhesive Properties to substrate | |
|---|---|---|---|---|
| | Polymer (parts) | Solvent (parts) | PP substrate | PMMA substrate |
| Compar. Ex. 16 | PMMA*[1] | Toluene 95 | 0/100 | 100/100 |
| Compar. Ex. 17 | PP*[2] | Xylene 95 | 100/100 | 0/100 |

*[1]"Acrypet VH" produced by Mitsubishi Rayon Co., Ltd.
*[2]"NOVATEC FA3DA" produced by Japan Polychem Corporation

TABLE 25

| (Co) polymer | Composition of (co)polymer | Adhesive strength (kPa) |
|---|---|---|
| (A-1) | 4-t-Butylcyclohexyl methacrylate | 294 |
| (A-2) | 4-t-Butylcyclohexyl acrylate | 1078 |
| (A-3) | Cyclohexyl methacrylate | 294 |
| (A-4) | Tricyclodecanyl acrylate | 392 |
| (A-5) | 4-t-Butylcyclohexyl methacrylate/Acryester SL = 59/41 | 294 |
| (A-6) | 4-t-Butylcyclohexyl acrylate/Acryester SL = 64/36 | 294 |
| (A-7) | 3,3,5-Trimethylcyclohexyl acrylate | 392 |
| (A-8) | 4-t-Butylcyclohexyl methacrylate/MMA = 84/16 | 294 |
| (A-9) | 4-t-Butylcyclohexyl acrylate/MMA/St/dodecyl methacrylate = 80/14/4/2 | 686 |
| (A-10) | 4-t-Butylcyclohexyl methacrylate/MMA/St/dodecyl methacrylate = 80/14/4/2 | 392 |
| (A-11) | 3,5,5-Trimethylcyclohexyl methacrylate | 294 |
| (A-12) | 3,5,5-Trimethylcyclohexyl methacrylte/Acryester SL = 71/29 | 294 |
| (A-13) | 4-t-Butylcyclohexyl acrylate/MMA = 80/20 | 392 |
| (A-14) | 4-t-Butylcyclohexyl acrylate/BA = 80/20 | 490 |
| (A-15) | 4-t-Butylcyclohexyl acrylate/St = 80/20 | 490 |
| (A-16) | 4-t-Butylcyclohexyl acrylate/HEA = 90/10 | 686 |
| (A-17) | 4-t-Butylcyclohexyl acrylate/HEA = 81/19 | 588 |
| (A-18) | 4-t-Butylcyclohexyl acrylate/HEA/methacrylic acid = 90/9/1 | 686 |
| (A-19) | 4-t-Butylcyclohexyl acrylate/4HBA = 90/10 | 686 |
| (A-20) | 4-t-Butylcyclohexyl acrylate/4HBA/methacrylic acid = 90/9/1 | 686 |
| (A-21) | 4-t-Butylcyclohexyl acrylate/FM-1 = 90/10 | 686 |
| (A-22) | 4-t-Butylcyclohexyl acrylate/FM-2 = 90/10 | 784 |
| (A-23) | 4-t-Butylcyclohexyl acrylate/CHDMMA = 90/10 | 882 |
| (A-24) | t-Butyl methacrylate | 392 |
| (A-25) | t-Butyl methacrylate/lauryl methacrylte = 58/42 | 294 |
| (A-26) | 4-t-Butylcyclohexyl acrylate/1-hexene = 84/16 | 294 |
| (E-1) | Benzyl methacrylate | 98 |
| (E-2) | Isobutyl methacrylate | 98 |
| (E-3) | 2-Phenylethyl methacrylate | 98 |

INDUSTRIAL APPLICABILITY

As described above, the primer composition of the present invention for coating has an excellent adhesive properties (adhesion) to a substrate comprising a polyolefin resin, acrylic resin, or the like, and the primer composition is moderate to environment since it does not contain chlorine.

The invention claimed is:

1. A method of coating a substrate, comprising:
    applying a primer composition to a polyolefin resin substrate;
    wherein the primer composition comprises a polymer (A) having a unit of a (meth)acrylic ester monomer (a) in which acryloyloxy group or methacryloyloxy group is bonded to secondary carbon atom or tertiary carbon atom and a unit of monomer (b),
    wherein the (meth)acrylic ester monomer (a) is at least one selected from the group consisting of 4-t-butylcyclohexyl acrylate, tricyclodecanyl acrylate, 3,3,5-trimethylcyclohexyl acrylate, and t-butylmethacrylate; and the monomer (b) is at least one selected from the group consisting of (meth)acrylic esters, monomers having hydroxyl group in a molecule, methacrylic acid and styrene, and the content of the unit of monomer (a) in the polymer (A) is no less than 80% by mass and the content of the unit of the monomer (b) in the polymer (A) is no more than 20% by mass.

2. The method of claim 1, wherein the primer composition further comprises a polymer (B) that is different from the polymer (A).

3. The method of claim 2, wherein the polymer (B) is a polyolefin resin.

4. The method of claim 1, wherein the primer composition is applied to a substrate that consists of a polyolefin resin.

5. The method of claim 1, wherein the primer composition is applied to a polyolefin resin molded product.

6. The method of claim 1, wherein the primer composition does not contain any compound having a chlorine atom.

7. The method of claim 5, further comprising:
    after the applying, drying the primer composition applied to the polyolefin molded product.

8. The method of claim 1, wherein the primer composition is applied to the polyolefin resin substrate without surface treating before the applying.

9. The method of claim 1, wherein the monomer (a) is 4-t-butylcyclohexyl acrylate and the monomer (b) is at least one selected from the group consisting of methacrylate, styrene, dodecyl methacrylate, and butylacrylate.

10. The method of claim 9, wherein the primer composition applied to the polyolefin resin substrate has an adhesive strength of 392 kPa or greater.

11. The method of claim 9, wherein the primer composition applied to polyolefin resin substrate has an adhesive strength of 686 kPa or greater.

12. The method of claim 9, wherein the primer composition applied to the polyolefin resin substrate has an adhesive strength of 490 kPa or greater.

13. The method of claim 9, wherein the primer composition applied to the polyolefin resin substrate has an adhesive strength of 882 kPa or greater.

14. The method of claim 1, wherein the primer composition applied to the polyolefin resin substrate has an adhesive strength of from 392 to 882 kPa.

15. The method of claim 1, wherein the monomer (b) is at least one selected from the group consisting of a (meth)acrylic ester, a (meth)acrylic ester having a hydroxyl group, methacrylic acid and styrene.

16. The method of claim 1, wherein the monomer (b) is at least one (meth)acrylic ester having a hydroxyl group selected from the group consisting of 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate, 4-hydroxybutyl(meth)acrylate, 3-chloro-2-hydroxypropyl(meth)acrylate, polyethylene glycol(meth)acrylate, polypropylene glycol(meth)acrylate and caprolactone adducts thereof.

17. The method of claim 1, wherein the monomer (b) is at least one selected from the group consisting of a (meth)acrylic ester, a (meth)acrylic acid and a styrene.

* * * * *